United States Patent
Alber et al.

(10) Patent No.: US 9,908,615 B2
(45) Date of Patent: Mar. 6, 2018

(54) ROTOR BLOWN WING AIRCRAFT INCLUDING A ROTOR BLOWN WING HAVING AT LEAST ONE SELECTIVELY CONTROLLABLE CONTROL SURFACE AND A METHOD OF CONTROLLING A ROTOR BLOWN WING AIRCRAFT

(71) Applicant: Sikorsky Aircraft Corporation, Stratford, CT (US)

(72) Inventors: Mark R. Alber, Milford, CT (US); Jeffery Parkhurst, Meriden, CT (US); Cody Fegely, Milford, CT (US); Stephen Kubik, Shelton, CT (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 0 days.

(21) Appl. No.: 15/234,562

(22) Filed: Aug. 11, 2016

(65) Prior Publication Data

US 2017/0158312 A1    Jun. 8, 2017

Related U.S. Application Data

(60) Provisional application No. 62/246,357, filed on Oct. 26, 2015.

(51) Int. Cl.
| | |
|---|---|
| G05D 1/00 | (2006.01) |
| B64C 13/16 | (2006.01) |
| B64C 29/02 | (2006.01) |
| B64C 9/00 | (2006.01) |
| B64C 25/52 | (2006.01) |
| G01C 21/16 | (2006.01) |

(52) U.S. Cl.
CPC ............... *B64C 13/16* (2013.01); *B64C 9/00* (2013.01); *B64C 25/52* (2013.01); *B64C 29/02* (2013.01); *G01C 21/165* (2013.01)

(58) Field of Classification Search
USPC .................................................. 701/4
See application file for complete search history.

(56) References Cited

U.S. PATENT DOCUMENTS

| | | | | |
|---|---|---|---|---|
| 2,198,941 A | * | 4/1940 | Jacobs | B64C 27/026 244/8 |
| 3,116,040 A | | 12/1963 | Petrides et al. | |
| 3,166,271 A | * | 1/1965 | Zuck | B64D 35/00 244/48 |
| 4,789,115 A | * | 12/1988 | Koutsoupidis | B64C 27/26 244/215 |
| 5,114,096 A | | 5/1992 | Wernicke | |
| 6,691,949 B2 | * | 2/2004 | Plump | B64C 29/02 244/12.2 |
| 6,896,221 B1 | * | 5/2005 | Einarsson | B64C 3/38 244/12.4 |

(Continued)

*Primary Examiner* — Tyler D Paige
(74) *Attorney, Agent, or Firm* — Cantor Colburn LLP

(57) ABSTRACT

A rotor blown wing (RBW) aircraft including an airframe, at least one rotor blown wing (RBW) having at least control selectively controllable surface, at least one rotor configured to generate and direct an airflow over the at least one RBW, and a control system operatively connected to the at least two selectively controllable control surfaces. The control system selectively controls the at least one selectively controllable control surface to change the airflow over the at least one RBW to facilitate a vertical landing.

18 Claims, 2 Drawing Sheets

(56) References Cited

U.S. PATENT DOCUMENTS

| | | | |
|---|---|---|---|
| 8,505,846 B1 | 8/2013 | Sanders, II | |
| 9,676,479 B2* | 6/2017 | Brody | B64C 27/28 |
| 2007/0158494 A1* | 7/2007 | Burrage | B64C 39/04 |
| | | | 244/7 R |
| 2008/0237392 A1* | 10/2008 | Piasecki | B64C 27/26 |
| | | | 244/6 |
| 2010/0252690 A1* | 10/2010 | Hothi | B64C 39/024 |
| | | | 244/7 B |
| 2012/0018572 A1* | 1/2012 | Shai | F42B 10/14 |
| | | | 244/39 |
| 2012/0248259 A1* | 10/2012 | Page | B64C 29/02 |
| | | | 244/7 A |
| 2016/0304196 A1* | 10/2016 | Alber | B64C 29/02 |
| 2017/0158312 A1* | 6/2017 | Alber | B64C 13/16 |

\* cited by examiner

ROTOR BLOWN WING AIRCRAFT INCLUDING A ROTOR BLOWN WING HAVING AT LEAST ONE SELECTIVELY CONTROLLABLE CONTROL SURFACE AND A METHOD OF CONTROLLING A ROTOR BLOWN WING AIRCRAFT

CROSS REFERENCE TO RELATED APPLICATIONS

This application claims priority to U.S. Provisional Patent Application No. 62/246,357, which was filed on Oct. 26, 2015. The entire contents of U.S. Provisional Patent Application No. 62/246,357 are incorporated herein by reference.

STATEMENT OF FEDERAL SUPPORT

This invention was made with Government support under HR0011-14-C-0010 awarded by the Defense Advanced Research Projects Agency (DARPA). The Government has certain rights in the invention.

BACKGROUND

Exemplary embodiments pertain to the art of rotor blown wing aircraft and, more particularly, to a rotor blown wing aircraft including a rotor blown wing having at least one selectively controllable control surface.

Rotor blown wing (RBW) includes at least one wing and one or more proprotors. The proprotors generate a downwash that is passed over the wing to increase net wing lift. Accordingly, a RBW aircraft may hover like a rotary wing aircraft and also fly/cruise on the wing(s) as a conventional, fixed wing, aircraft. During hover, in light winds, wind relative to the wing may be at or near stall. Aircraft attitudes necessary to maintain position over a desired landing location may exceed landing capabilities, including the aircrafts' design attitude, thereby limiting an overall operational envelope of the aircraft.

BRIEF DESCRIPTION

Disclosed is a rotor blown wing (RBW) aircraft including an airframe, at least one rotor blown wing (RBW) having at least one selectively controllable control surface, at least one rotor configured to generate and direct an airflow over the at least one RBW, and a control system operatively connected to the at least one selectively controllable control surface. The control system selectively controls the at least one selectively controllable control surface to change the airflow over the at least one RBW to facilitate a vertical landing.

In addition to one or more of the features described above or below, or as an alternative, further embodiments could include wherein the at least one RBW includes a leading edge and a trailing edge, the at least one selectively controllable control surface being arranged at the trailing edge.

In addition to one or more of the features described above or below, or as an alternative, further embodiments could include wherein the at least one RBW includes a leading edge and a trailing edge, the at least one selectively controllable control surface being arranged at the leading edge.

In addition to one or more of the features described above or below, or as an alternative, further embodiments could include wherein the at least one selectively controllable control surface includes a first selectively controllable control surface arranged on a first side of the at least one RBW and a second selectively controllable control surface arranged on a second, opposing side of the at least one RBW.

In addition to one or more of the features described above or below, or as an alternative, further embodiments could include wherein the controller selectively independently controls a position of the at least one of the first and second selectively controllable control surfaces to change the airflow over the at least one RBW.

In addition to one or more of the features described above or below, or as an alternative, further embodiments could include a sensor operatively coupled to the control system, the control system controlling the at least one selectively controllable control surface based on the positional changes of the RBW aircraft sensed by the sensor.

In addition to one or more of the features described above or below, or as an alternative, further embodiments could include wherein the sensor comprises an inertial sensor.

In addition to one or more of the features described above or below, or as an alternative, further embodiments could include wherein the inertial sensor comprises an embedded GPS/Inertial (EGI) sensor.

In addition to one or more of the features described above or below, or as an alternative, further embodiments could include wherein the sensor comprises a trim sensor.

In addition to one or more of the features described above or below, or as an alternative, further embodiments could include wherein the at least one RBW includes a first RBW portion extending between the airframe and the at least one rotor and a second RBW portion extending outboard of the at least one rotor, the at least one selectively controllable control surface including at least one first selectively controllable control surface associated with the first RBW portion and at least one second selectively controllable control surface associated with the second RBW portion.

In addition to one or more of the features described above or below, or as an alternative, further embodiments could include wherein the at least one first selectively controllable control surface includes at least two first selectively controllable control surfaces and the at least one second selectively controllable control surface includes at least two second selectively controllable control surfaces.

Also disclosed is a method of controlling an attitude of a rotor blown wing (RBW) aircraft including at least one rotor blown wing (RBW) having at least one selectively controllable control surface. The method includes generating an airflow over the RBW, sensing an attitude of the RBW aircraft, and changing the airflow over the RBW by selectively activating the at least one selectively controllable control surface, and vertically landing the RBW aircraft.

In addition to one or more of the features described above or below, or as an alternative, further embodiments could include wherein sensing the attitude of the RBW aircraft includes monitoring aircraft trim changes.

In addition to one or more of the features described above or below, or as an alternative, further embodiments could include wherein activating the at least one selectively controllable control surface includes changing the airflow over the RBW wing to compensate for the trim changes.

In addition to one or more of the features described above or below, or as an alternative, further embodiments could include wherein sensing the attitude of the RBW aircraft includes sensing inertial changes in the RBW aircraft through one or more signals received from inertial sensors.

In addition to one or more of the features described above or below, or as an alternative, further embodiments could include wherein sensing inertial changes in the RBW aircraft includes receiving one or more signals from an embedded GPS/Inertial (EGI) sensor.

In addition to one or more of the features described above or below, or as an alternative, further embodiments could include wherein selectively activating the at least one selectively controllable control surface includes selectively independently activating at least two selectively controllable control surfaces arranged at a trailing edge of the RBW.

In addition to one or more of the features described above or below, or as an alternative, further embodiments could include wherein selectively activating the at least one selectively controllable control surface includes selectively independently activating at least two selectively controllable control surfaces arranged at a leading edge of the RBW.

In addition to one or more of the features described above or below, or as an alternative, further embodiments could include wherein selectively activating the at least one selectively controllable control surface includes selectively independently activating at least two control surfaces arranged at a leading edge of the RBW and selectively independently activating at least two selectively controllable control surfaces arranged at a leading edge of the RBW wing.

In addition to one or more of the features described above or below, or as an alternative, further embodiments could include wherein selectively activating the at least one selectively controllable control surface includes selectively activating a first selectively controllable control surface arranged along the RBW between an airframe and a rotor and a second selectively controllable control surface arranged along the RBW outboard of the rotor.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
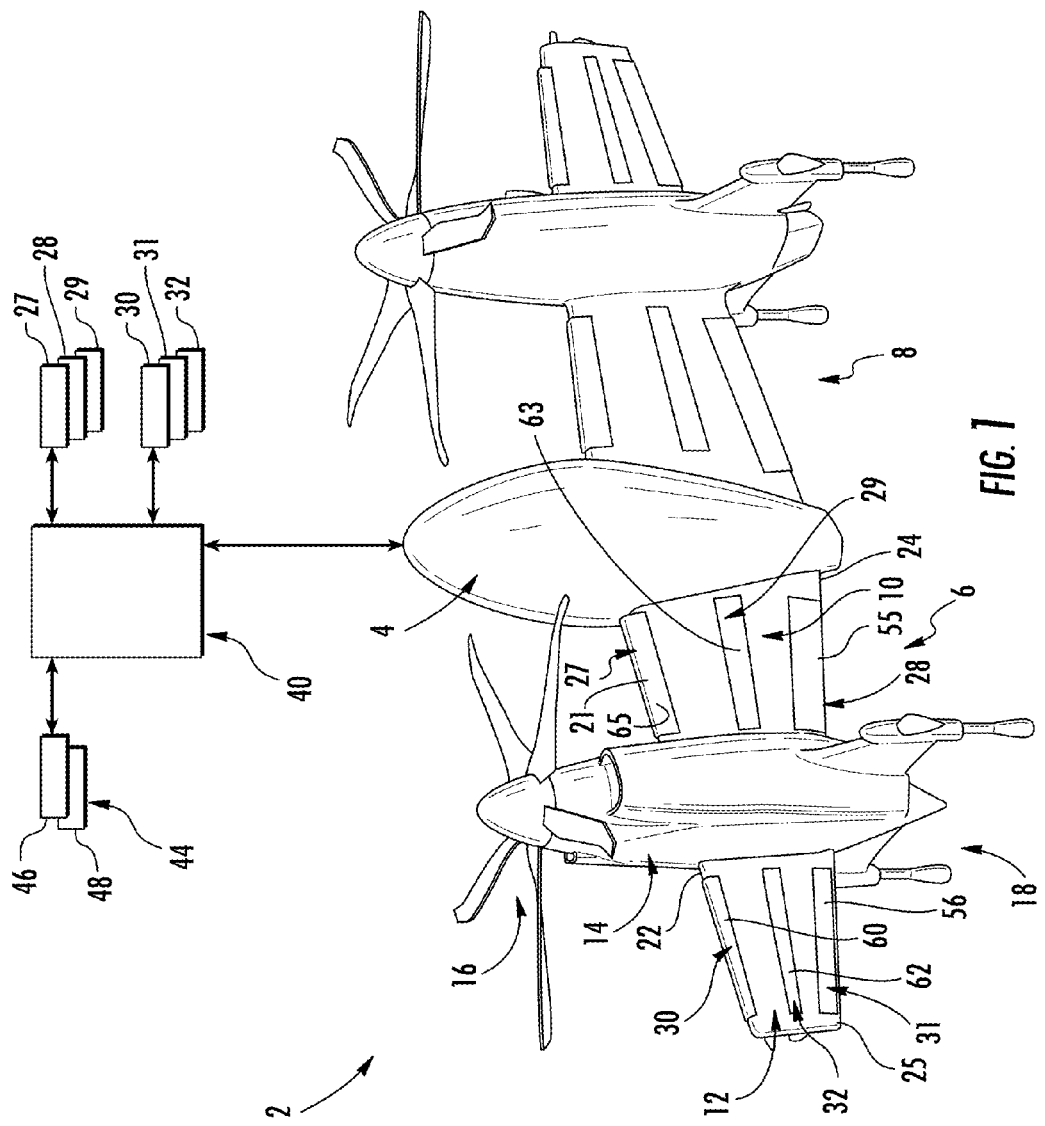
FIG. 1 is perspective view of a rotor blown wing (RBW) aircraft including a rotor blown wing (RBW) including at least one selectively controllable control surface, in accordance with an exemplary embodiment.

A rotor blown wing (RBW) aircraft, in accordance with an exemplary embodiment, is indicated generally at 2 in FIG. 1. RBW aircraft 2 includes an airframe 4 that supports a first RBW 6 and a second RBW 8. As each RBW 6 and 8 is substantially similarly constructed, a detailed description will follow with reference to RBW 6 with an understanding that RBW 8 may include similar details. RBW 6 may include a first RBW portion 10 and a second RBW portion 12 separated by a nacelle 14. First RBW portion 10 is arranged inboard of nacelle 14.

In the exemplary embodiment shown, nacelle 14 supports a rotor 16 as well as a plurality of landing supports indicated generally at 18. As will be appreciated more fully below, it should be understood that RBW aircraft 2 may include a RBW wing uninterrupted by a nacelle and/or a rotor. Each RBW portion 10 and 12 includes a corresponding leading edge 21 and 22 and a trailing edge 24 and 25. In accordance with an aspect of an exemplary embodiment, leading edge 21 of first RBW portion 10 may include one or more selectively controllable control surfaces 27. Similarly, trailing edge 24 of first RBW portion 10 may include one or selectively controllable more control surfaces 28. An additional one or more selectively controllable control surfaces 29 may be arranged between leading edge 21 and trailing edge 24. In accordance with another aspect of an exemplary embodiment, leading edge 22 of second RBW portion 12 may include one or more selectively controllable control surfaces 30. Similarly, trailing edge 25 of second RBW portion 12 may include one or more selectively controllable control surfaces 31. An additional one or more selectively controllable control surfaces 32 may be arranged between leading edge 22 and trailing edge 25. At this point, it should be understood that the number and location of control surfaces may vary.

In further accordance with an exemplary embodiment, RBW aircraft 2 includes a control system 40 which operates to selectively and independently, deploy one or more of control surfaces 27, 28, 29 and 30, 31, 32 to facilitate a vertical landing. That is, control system 40 may deploy one or more of control surfaces 27, 28, 29 and/or 30, 31, 32 to bring RBW aircraft 2 to rest on landing supports 18. Control system 40 is also operatively connected to one or more sensors 44 that may detect an orientation of RBW aircraft 2 and/or air currents impinging upon first and second RBWs 6 and 8. In accordance with an aspect of an exemplary embodiment, one or more sensors 44 may include an inertial sensor 46. In accordance with another aspect of an exemplary embodiment, inertial sensor 46 may take the form of an embedded GPS/Inertial (EGI) sensor. In accordance with yet another aspect of an exemplary embodiment, sensors 44 may include a trim sensor 48 that senses changes in trim responsive to external forces on RBW aircraft 2.

Figure 2:
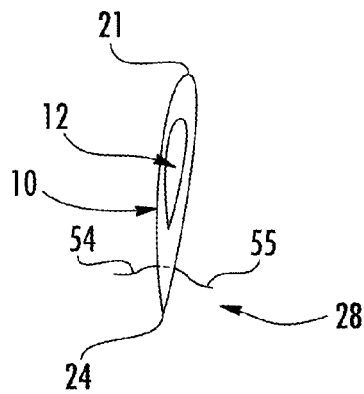
FIG. 2 is an end view of the RBW of FIG. 1 depicting deployment of a first two selectively controllable control surfaces, in accordance with an aspect of an exemplary embodiment.

In accordance with an aspect of an exemplary embodiment, control surfaces 28 take the form of first and second control surfaces or flaps 54 and 55 arranged at trailing edge 24 of first RBW portion 10, as shown in FIG. 2. First flap 54 may be arranged on a first side (not separately labeled) of RBW portion 10 and second flap 55 may be arranged on a second, opposing side (also not separately labeled) of RBW portion 10. Control system 40 may selectively activate one, the other, or both of flaps 54 and 55 to facilitate changes in an orientation of airframe 4 in order to facilitate a vertical landing. Specifically, control system 40 may selectively activate one, the other, or both of flaps 54 and/or 55 to change, e.g., spoil, alter, adjust an airflow over RBW portion 10 in order to counteract forces that may tend to hinder a vertical landing. Similarly, control surfaces 31 take the form of flaps, one of which is indicated at 56 on trailing edge 25 of second RBW portion 10.

Figure 3:
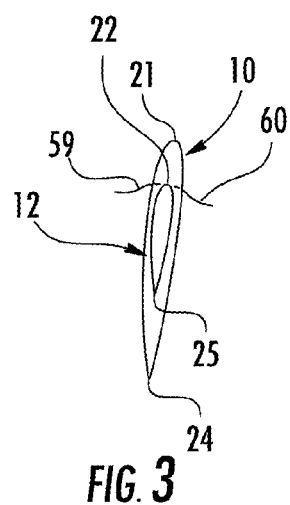
FIG. 3 is an end view of the RBW of FIG. 1 depicting deployment of a second two selectively controllable control surfaces, in accordance with another aspect of an exemplary embodiment.

In accordance with another aspect of an exemplary embodiment, control surfaces 30 take the form of first and second control surfaces or flaps 59 and 60 arranged at leading edge 22 of second RBW portion 12, as shown in FIG. 3. First flap may be arranged on the first surface of RBW portion 12 and second flap 59 may be arranged on the second, opposing surface of RBW portion 12. Control system 40 may selectively activate one, the other, or both of flaps 59 and 60 to facilitate changes in an orientation of airframe 4 in order to facilitate a vertical landing. Specifically, control system 40 may selectively activate one, the other, or both of flaps 59 and/or 60 to change, e.g., spoil, alter, adjust an airflow over RBW portion 10 in order to counteract forces that may tend to hinder a vertical landing.

Figure 4:
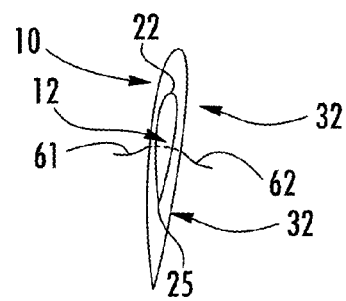
FIG. 4 is an end view of the RBW of FIG. 1 depicting deployment of a third two selectively controllable control surfaces, in accordance with another aspect of an exemplary embodiment.

In accordance with another aspect of an exemplary embodiment, control surfaces 32 take the form of first and second control surfaces or flaps 61 and 62 arranged between leading edge 22 and trailing edge 25 of each surface (not separately labeled) of RBW portion 12, as shown in FIG. 4. Control system 40 may selectively activate one, the other, or both of flaps 61 and 62 to facilitate changes in an orientation of airframe 4 in order to facilitate a vertical landing. Similarly, control surfaces 29 may include first and second flaps, one of which is indicated at 63 in FIG. 1, that are selectively controllable to change an airflow over first RBW portion 10 to facilitate a vertical landing. Specifically, control system 40 may selectively activate one, the other, or both of flaps 61, 62, and/or flaps 63 to change, e.g., spoil, alter, adjust an airflow over RBW portion 10 in order to counteract forces that may tend to hinder a vertical landing.

Figure 5:
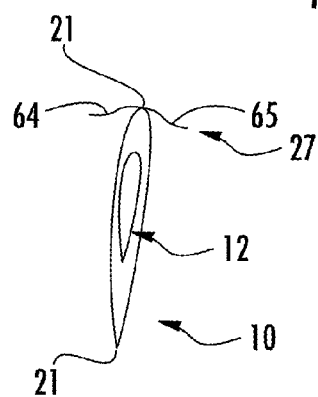
FIG. 5 is an end view of the RBW of FIG. 1 depicting deployment of a fourth two selectively controllable control surfaces, in accordance with yet another aspect of an exemplary embodiment.

Still further, control surfaces 27 may take the form of first and second control surfaces or flaps 64 and 65 arranged at leading edge 21 of first RBW portion 10, as shown in FIG. 5. Likewise control surfaces 30 may take the form of first and second flaps, one of which is indicated at 67 in FIG. 1. Control system 40 may selectively activate one, the other, or both of flaps 64 and 65 and/or 67 to facilitate changes in an orientation of airframe 4 in order to facilitate a vertical landing. Specifically, control system 40 may selectively activate one, the other, or both of flaps 64, 65, and/or flaps 67 to change, e.g., spoil, alter, adjust an airflow over RBW portion 10 in order to counteract forces that may tend to hinder a vertical landing. Additionally, it should be understood, that leading edge 22 of second RBW portion 12 may include one or more selectively controllable flaps (not separately labeled).

In accordance with exemplary aspects, control system 40 receives inputs from one or more of sensors 44 regarding an orientation of airframe 4 relative to, for example, ground. Deviations in airframe orientation may result from winds, rotor operation, and the like. In order to account for various external forces on airframe 4, control system 40 selectively activates one or more of control surfaces 27, 28, and 30, 31 in order to change, spoil and/or alter an airflow over RBW 6 to control lift, create drag, and facilitate attitude correction moments thereby allowing RBW aircraft 2 to come to rest on landing supports 18.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A rotor blown wing (RBW) aircraft comprising:
   an airframe;
   at least one rotor blown wing (RBW) including a first selectively controllable control surface arranged on one side of the at least one rotor blown wing and a second selectively controllable control surface arranged on a second, opposing side of the at least one rotor blown wing directly opposite of the first selectively controllable surface;
   at least one rotor configured to generate and direct an airflow over the at least one RBW; and
   a control system operatively connected to the first and second selectively controllable control surfaces, the control system selectively controlling the first and second selectively controllable control surfaces to change the airflow over the at least one RBW to facilitate a vertical landing.

2. The RBW aircraft according to claim 1, wherein the at least one RBW includes a leading edge and a trailing edge, the first and second selectively controllable control surfaces being arranged at the trailing edge.

3. The RBW according to claim 1, wherein the at least RBW includes a leading edge and a trailing edge, the first and second selectively controllable control surfaces being arranged at the leading edge.

4. The RBW aircraft according to claim 1, wherein the control system selectively independently controls a position of at least one of the first and second selectively controllable control surfaces to change the airflow over the at least one RBW.

5. The RBW aircraft according to claim 3, further comprising: a sensor operatively coupled to the control system, the control system controlling the first and second selectively controllable control surfaces based on the positional changes of the RBW aircraft sensed by the sensor.

6. The RBW aircraft according to claim 5, wherein the sensor comprises an inertial sensor.

7. The RBW aircraft according to claim 6, wherein the inertial sensor comprises an embedded GPS/Inertial (EGI) sensor.

8. The RBW aircraft according to claim 5, wherein the sensor comprises a trim sensor.

9. The RBW aircraft according to claim 1, wherein the at least one RBW includes a first RBW portion extending between the airframe and the at least one rotor and a second RBW portion extending outboard of the at least one rotor, the first and second selectively controllable control surfaces being associated with the first RBW portion and third and fourth selectively controllable control surfaces being associated with the second RBW portion.

10. A method of controlling an attitude of a rotor blown wing (RBW) aircraft including at least one rotor blown wing (RBW) having a first selectively controllable control surface arranged on one side of the at least one rotor blown wing and a second selectively controllable control surface arranged on a second, opposing side of the at least one rotor blown wing directly opposite of the first selectively controllable surface, the method comprising:
 generating an airflow over the RBW;
 sensing an attitude of the RBW aircraft;
 changing the airflow over the RBW by selectively activating one or more of the first and second selectively controllable control surfaces; and
 vertically landing the RBW aircraft.

11. The method of claim 10, wherein sensing the attitude of the RBW aircraft includes monitoring aircraft trim changes.

12. The method of claim 11, wherein activating the at least one first and second selectively controllable control surfaces includes changing the airflow over the RBW to compensate for the trim changes.

13. The method according to claim 10, wherein sensing the attitude of the RBW aircraft includes sensing inertial changes in the RBW aircraft through one or more signals received from inertial sensors.

14. The method of claim 13, wherein sensing inertial changes in the RBW aircraft includes receiving one or more signals from an embedded GPS/Inertial (EGI) sensor.

15. The method according to claim 11, wherein selectively activating the first and second selectively controllable control surfaces includes selectively independently activating the first and second selectively controllable control surfaces arranged at a trailing edge of the RBW.

16. The method according to claim 15, wherein selectively activating the first and second selectively controllable control surfaces includes selectively independently activating the first and second selectively controllable control surfaces arranged at a leading edge of the RBW.

17. The method according to claim 15, wherein selectively activating the first and second selectively controllable control surfaces includes selectively independently activating the first and second selectively controllable control surfaces arranged at a leading edge of the RBW and selectively independently activating third and fourth selectively controllable control surfaces arranged at a leading edge of the RBW.

18. The method according to claim 10, wherein selectively activating the first and second selectively controllable control surfaces includes selectively activating the first and second selectively controllable control surfaces arranged along the RBW between an airframe and a rotor and third and fourth selectively controllable control surfaces arranged along the RBW outboard of the rotor.

\* \* \* \* \*

UNITED STATES PATENT AND TRADEMARK OFFICE
CERTIFICATE OF CORRECTION

PATENT NO. : 9,908,615 B2
APPLICATION NO. : 15/234562
DATED : March 6, 2018
INVENTOR(S) : Mark R. Alber et al.

Page 1 of 1

It is certified that error appears in the above-identified patent and that said Letters Patent is hereby corrected as shown below:

On the Title Page

Item (72), Please correct spelling of the name of the second listed inventor to JEFFREY PARKHURST.

Signed and Sealed this
Seventh Day of May, 2019

Andrei Iancu
*Director of the United States Patent and Trademark Office*